United States Patent [19]
Koering

[11] Patent Number: 5,451,105
[45] Date of Patent: Sep. 19, 1995

[54] SELF-SUPPORTING APPARATUS FOR REPEATEDLY AGITATING AN AEROSOL CANISTER

[76] Inventor: Herman J. Koering, 4536 E. Emilita, Mesa, Ariz. 85206

[21] Appl. No.: 281,362

[22] Filed: Jul. 27, 1994

[51] Int. Cl.[6] .............................................. B01F 11/00
[52] U.S. Cl. ...................................... 366/130; 366/209; 366/212; 366/240
[58] Field of Search ............... 366/130, 129, 208, 209, 366/212, 213, 219, 240

[56] References Cited

U.S. PATENT DOCUMENTS

| | | | |
|---|---|---|---|
| 892,046 | 6/1908 | Hall | 366/240 |
| 989,783 | 4/1911 | Jeffris | 366/212 |
| 1,204,849 | 11/1916 | Daniel | 366/212 |
| 1,243,634 | 10/1917 | Sandefur | 366/240 |
| 1,425,395 | 8/1922 | Levy | 366/240 |
| 1,530,212 | 3/1925 | Solon | 366/240 |
| 2,029,234 | 1/1936 | Helmes | 366/209 |
| 2,700,097 | 1/1955 | Morey | 366/212 |
| 4,318,622 | 3/1982 | Sterrenberg | 366/208 |
| 4,420,262 | 12/1983 | Sterrenberg | 366/208 |
| 5,273,357 | 12/1993 | Currie | 366/212 |

Primary Examiner—David Scherbel
Assistant Examiner—Tony G. Soohoo
Attorney, Agent, or Firm—Harry M. Weiss; Jeffrey D. Moy

[57] ABSTRACT

Self-supporting apparatus and methods therefore are disclosed for repeatedly agitating an aerosol canister such as an aerosol canister of paint. The apparatus includes a tubular member for retaining a canister of paint. Additionally, a cap is forced upon the top end of the canister in order to force the bottom of the canister against a rotating cam member. As the cam member rotates, the canister and the contents therein are agitated.

8 Claims, 2 Drawing Sheets

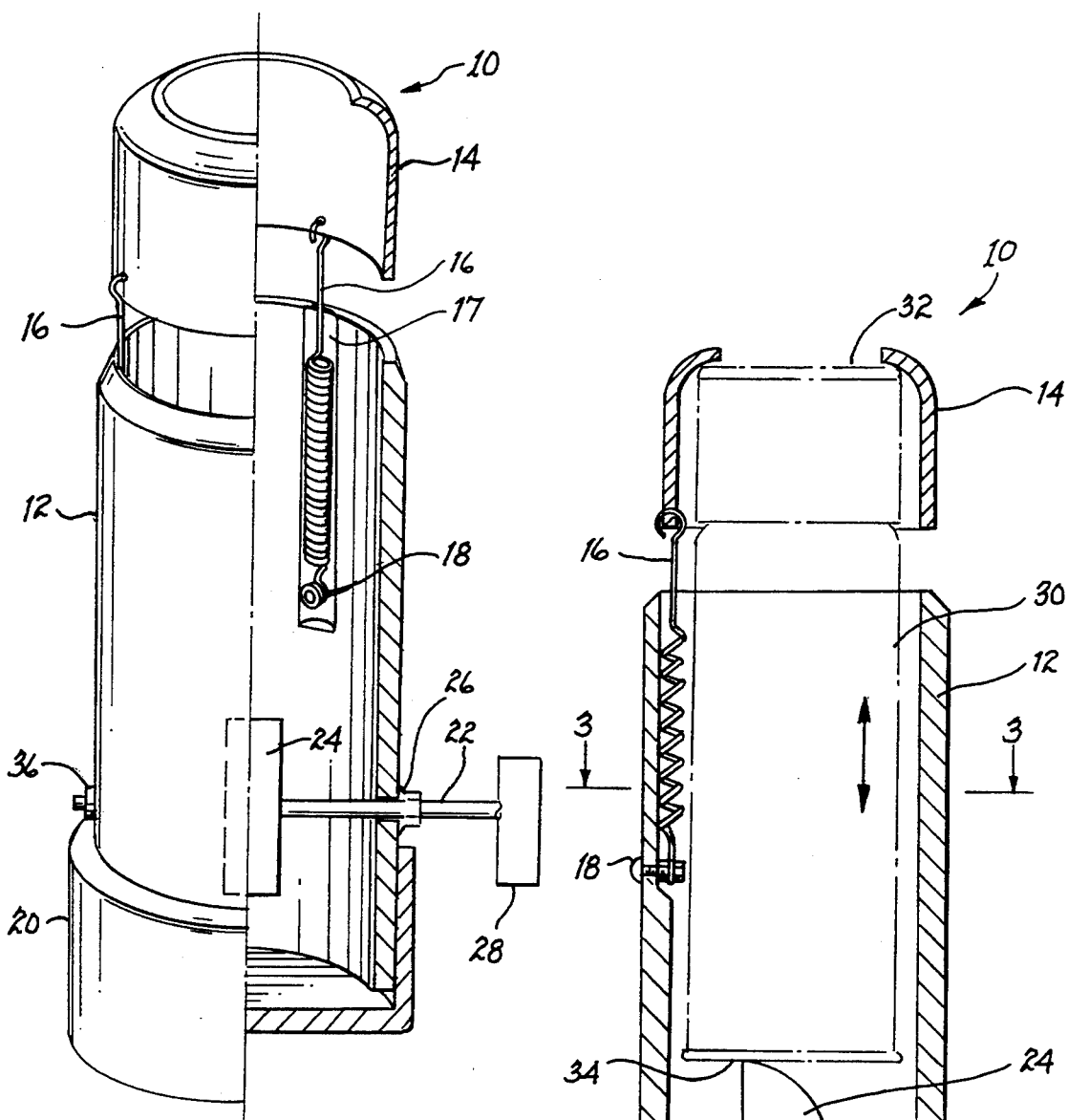
fig. 1
fig. 2
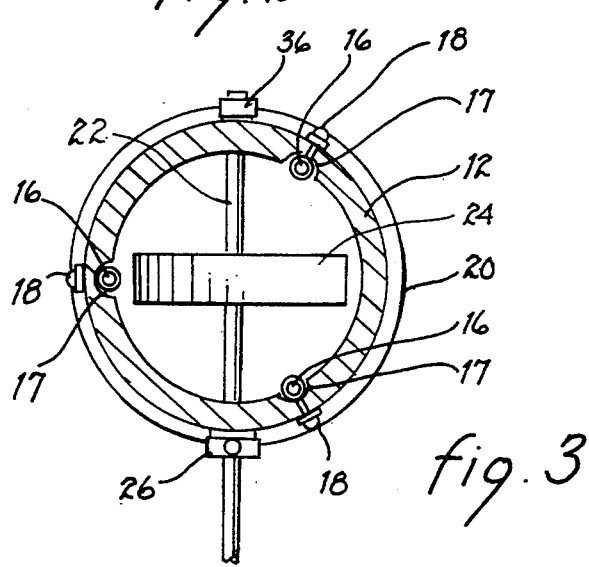
fig. 3

SELF-SUPPORTING APPARATUS FOR REPEATEDLY AGITATING AN AEROSOL CANISTER

BACKGROUND OF THE INVENTION

1. Field of the Invention

This invention relates generally to agitation apparatus and, more specifically, to a self-supporting apparatus for repeatedly agitating an aerosol canister and methods therefor.

2. Description of the Related Art

Those skilled in the painting arts understand that paint must be thoroughly mixed prior to use. This is done to ensure that pigment that may have settled out of the liquid carrier is mixed therewith. Various apparatus are well known in the art for agitating relatively large paint cans, however, there is no known apparatus for agitating smaller, aerosol type paint canisters.

U.S. Pat. No. 4,318,622 filed by Sterrenberg provides an apparatus for utilizing a hand-held power tool for shaking a paint canister. There are several disadvantages to this concept. First, a separate, hand-held power tool is required. In other words, a user of this concept must purchase a separate, hand-held power tool in addition to the shaking apparatus. Additionally, if one needs to use the hand-held power tool for some purpose other than agitating a paint canister while the hand-held power tool is being used to shake a paint canister, then the user must wait until the shaking operation is completed. Also, the Sterrenberg apparatus must be held while in use. Thus, for the several minutes that it takes in order to properly agitate a paint canister using the Sterrenberg apparatus, the user must hold both the hand-held power tool and the apparatus, thereby wasting time because in the absence of such a limiting requirement, a user could be performing other work.

Therefore, there existed a need to provide a stand-alone, self-supporting apparatus for agitating aerosol type paint canisters.

SUMMARY OF THE INVENTION

In accordance with one embodiment of this invention, it is an object of this invention to provide a self-supporting apparatus for repeatedly agitating an aerosol canister such as an aerosol canister of paint.

It is another object of this invention to provide a method for repeatedly agitating an aerosol canister such as an aerosol canister of paint.

BRIEF DESCRIPTION OF THE PREFERRED EMBODIMENTS

In accordance with one embodiment of this invention, a self-supporting apparatus for repeatedly agitating an aerosol canister is disclosed comprising, in combination, agitation means for agitating the aerosol canister, and forcing means coupled to the agitation means for applying a force along a vertical axis of the aerosol canister and for forcing the aerosol canister against the agitation means. The agitation means comprises cam member means in contact with a portion of the aerosol canister for moving the aerosol canister up and down, a shaft coupled to the cam member means, and shaft driver means coupled to the shaft for rotating the shaft and the cam member means. The forcing means comprises tubular member means enclosing the aerosol canister for restricting the moving of the aerosol canister to up and down, cap means coupled to the tubular member means for applying the force against another portion of the aerosol canister, spring means coupled between the tubular member means and the cap means for forcing the cap means against the other portion of the aerosol canister, and support means coupled to the tubular member means for permitting the self-supporting apparatus to stand upright on a surface. Moreover, the spring means comprises a plurality of springs removably coupled between the tubular member means and the cap means. The tubular member means includes a plurality of retaining slots located on an interior surface thereof for retaining portions of each of the plurality of springs. The aforementioned portion of the aerosol canister is a bottom portion of the aerosol canister and the aforementioned other portion of the aerosol canister is a top portion of the aerosol canister.

In accordance with another embodiment of this invention, a self-supporting apparatus for repeatedly agitating an aerosol canister is disclosed comprising, in combination, agitation means for agitating the aerosol canister, and forcing means coupled to the agitation means for applying a force along a vertical axis of the aerosol canister and for forcing the aerosol canister against the agitation means. The agitation means comprises cam member means in contact with a portion of the aerosol canister for moving the aerosol canister up and down, a shaft coupled to the cam member means, and shaft driver means coupled to the shaft for rotating the shaft and the cam member means. The forcing means comprises tubular member means enclosing the aerosol canister for restricting the moving of the aerosol canister to up and down, cap means coupled to the tubular member means for applying the force against another portion of the aerosol canister, spring means coupled to the cap means for establishing the force against the other portion of the aerosol canister, and support means coupled to the tubular member means for permitting the self-supporting apparatus to stand upright on a surface. An interior surface portion of the cap means has interior threads for engagement with external threads of an exterior surface portion of the tubular member means. Additionally, the spring means comprises a spring fixedly coupled to an interior surface of the cap means. The aforementioned portion and the other portion of the aerosol canister are a bottom and top portion of the aerosol canister, respectively.

In accordance with yet another embodiment of this invention, a method for repeatedly agitating an aerosol canister is disclosed comprising the steps of providing agitation means for agitating the aerosol canister, and providing forcing means coupled to the agitation means for applying a force along a vertical axis of the aerosol canister and for forcing the aerosol canister against the agitation means. The step of providing the agitation means comprises the steps of providing cam member means in contact with a portion of the aerosol canister for moving the aerosol canister up and down, providing a shaft coupled to the cam member means, and providing shaft driver means coupled to the shaft for rotating the shaft and the cam member means. The step of providing the forcing means comprises the steps of providing tubular member means enclosing the aerosol canister for restricting the moving of the aerosol canister to up and down, providing cap means coupled to the tubular member means for applying the force against another portion of the aerosol canister, providing spring means coupled between the tubular member means and the cap means for forcing the cap means against the other portion of the aerosol canister, and providing support means coupled to the tubular member means for permitting the self-supporting apparatus to stand upright on a surface. The step of providing the spring means comprises the step of providing a plurality of springs removably coupled between the tubular member means and the cap means. The step of providing the tubular member means comprises the step of providing a plurality of retaining slots located on an interior surface thereof for retaining portions of each of the plurality of springs.

In accordance with still another embodiment of this invention, a method for repeatedly agitating an aerosol canister is disclosed comprising the steps of providing agitation means for agitating the aerosol canister, and providing forcing means coupled to the agitation means for applying a force along a vertical axis of the aerosol canister and for forcing the aerosol canister against the agitation means. The step of providing the agitation means comprises the steps of providing cam member means in contact with a portion of the aerosol canister for moving the aerosol canister up and down, providing a shaft coupled to the cam member means, and providing shaft driver means coupled to the shaft for rotating the shaft and the cam member means. The step of providing the forcing means comprises the steps of providing tubular member means enclosing the aerosol canister for restricting the moving of the aerosol canister to up and down, providing cap means coupled to the tubular member means for applying the force against another portion of the aerosol canister, providing spring means coupled to the cap means for establishing the force against the other portion of the aerosol canister, and providing support means coupled to the tubular member means for permitting the self-supporting apparatus to stand upright on a surface. The interior surface portion of the cap means has interior threads for engagement with external threads of an exterior surface portion of the tubular member means. The step of providing the spring means comprises the step of providing a spring fixedly coupled to an interior surface of the cap means.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a perspective view with parts broken away from one embodiment of the self-supporting apparatus for agitating an aerosol canister.

FIG. 2 is a cross-sectional view of the apparatus shown in FIG. 1.

FIG. 3 is a cross-sectional view taken along the line 3—3 of the apparatus shown in FIG. 2.

DESCRIPTION OF THE PREFERRED EMBODIMENTS

Figure 4A:
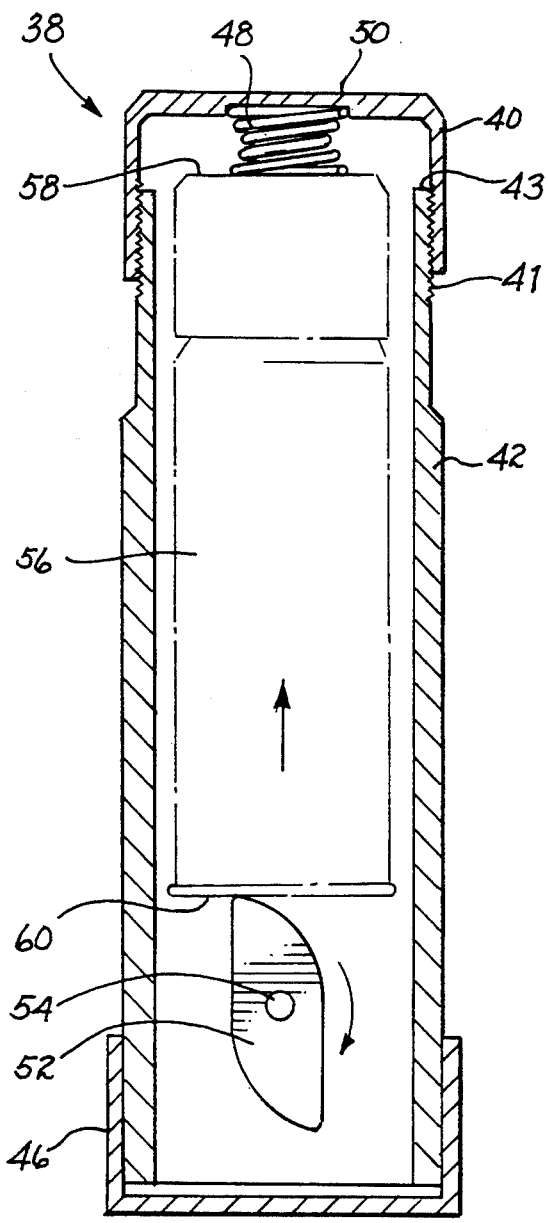
FIG. 4A is a cross-sectional view of another embodiment of the self-supporting apparatus for agitating an aerosol canister showing a cam member forcing the aerosol canister up.

Referring to FIG. 1, an embodiment of a stand-alone, self-supporting apparatus, or more simply, an apparatus for repeatedly agitating an aerosol canister is shown and generally designated by reference number 10. The apparatus 10 is attributed as being stand-alone because it does not require the use of an additional piece of equipment such as a hand-held power tool. Additionally, the apparatus 10 is referred to as being self-supporting because it does not have to be held by a user during operation.

Again, in FIG. 1, please note that the apparatus 10 is shown with parts broken away for convenience in explaining the apparatus 10. A tubular member 12 is coupled to a cap 14 with a plurality of springs 16. On one end of each of the springs 16, hooked portions are provided for insertion into holes in the cap 14. On the opposite end of each of the springs 16, another hooked portion is provided for connection via fasteners 18 to the tubular member 12. A screw and bolt type fastener 18 or any other suitable fastener 18 may be implemented. Each spring 16 fits substantially within a corresponding slot 17 located within an interior surface portion of the tubular member 12. A base support 20 is coupled to an end of the tubular member 12 for self-support of the apparatus 10 such that the apparatus 10 rests upright upon a surface. A shaft 22 extends through a portion of the tubular member 12, and the shaft 22 is secured with bearings 26 and 36 such that the shaft 22 is free to rotate therein. At one end of the shaft 22, a shaft driver 28 is provided for rotating the shaft 22. The shaft driver 28 may be an electric motor or any other suitable means for rotating the shaft 22. A cam member 24 having the shaft 22 penetrating there through is suspended within the tubular member 12.

Referring to FIG. 2, an aerosol canister 30 such as an aerosol paint canister is shown resting upright within the tubular member 12. Note that the canister 30 has its vertical axis parallel to the sides of the tubular member 12. The cam member 24 is shown in one position to be in contact with a bottom portion 34 of the canister 30 for lifting the canister 30. The cam member 24 is also shown in another position, in phantom. In this other position, the force caused by the springs 16 and the cap 14 push the top 32 of the canister 30 downward. Thus, as the shaft driver 28 rotates the cam member 24, the combination of the downward force against the vertical axis of the canister 30 caused by the springs 16 and the cap 14 with the repetitive, cyclical upward and downward force caused by the cam member 24 against the bottom portion 34 of the canister 30 will move the canister 30 up and down, thereby agitating the contents therein.

Referring to FIG. 3, a cross-sectional view of the apparatus 10 is shown. Note that in this view, three springs 16 are shown to be equally spaced around the perimeter of the tubular member 12, however, more than three springs 16 could be implemented, if desired. Further, please note that not all three springs 16 were shown in FIGS. 1 and 2 in order to simplify these drawings, however, in actuality, three springs 16 are used in the embodiment of the apparatus 10 shown in FIGS. 1–3.

Referring to FIG. 4A, another embodiment of the stand-alone, self-supporting apparatus for repeatedly agitating an aerosol canister is shown and generally designated by reference number 38. A tubular member 42 having external threads 41 on an external surface thereof is coupled to a cap 40 via internal threads 43 on an interior surface thereof. One end of a spring 48 is coupled to the inside of the cap 40 at depression 50. The opposite end of the spring 48 is in contact with a top portion 58 of a canister 56. A base support 46 is coupled to an end of the tubular member 42 for self-support of the apparatus 38 such that the apparatus 38 rests upright upon a surface. A shaft 54 extends through a portion of the tubular member 42, and the shaft 54 is secured with bearings (not shown) such that the shaft 54 is free to rotate therein. At one end of the shaft 54, a shaft driver (not shown) is provided for rotating the shaft 54. The shaft driver may be an electric motor or any other suitable means for rotating the shaft 54. A cam member 52 having the shaft 54 penetrating there through is suspended within the tubular member 42. Note that the canister 56 has its vertical axis parallel to the sides of the tubular member 42. The cam member 52 is shown to be in contact with a bottom portion 60 of the canister 56 for lifting the canister 56. With the cam member 52 in the position as shown, an upward force is exerted against the bottom portion 60 of the canister 56, thereby partially compressing the spring 48.

Figure 4B:
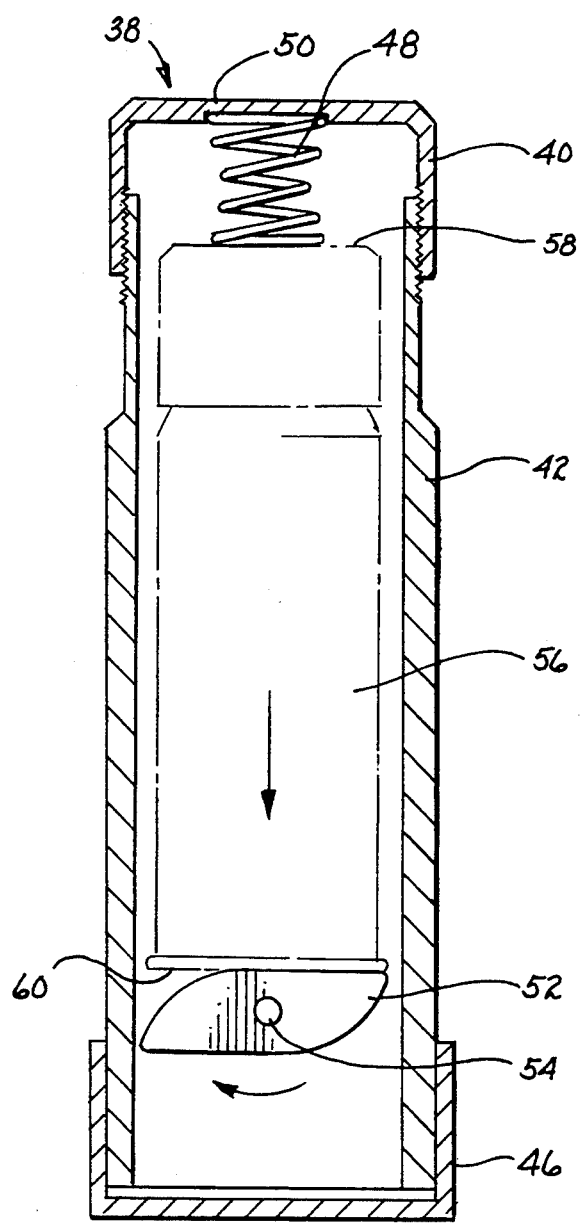
FIG. 4B is another cross-sectional view of the self-supporting apparatus for agitating an aerosol canister of FIG. 4A showing a spring forcing the aerosol canister down.

Referring to FIG. 4B, the cam member 54 is shown in another position. In this other position, the force caused by the spring 48 pushes against the top 58 of the canister 56. Thus, in reference to both FIGS. 4A and 4B, as the shaft driver rotates the cam member 52, the combination of the downward force against the vertical axis of the canister 56 caused by the spring 48 and the cap 40 with the repetitive, cyclical upward and downward force caused by the cam member 52 against the bottom portion 60 of the canister 56 will move the canister 56 up and down, thereby agitating the contents therein.

OPERATION

Referring to FIGS. 1–3, the upper hooked portion of each of the springs 16 are removed from the cap 14 in order to permit the insertion of the canister 30 into the tubular member 12. The upper hooked portion of each of the springs 16 is then inserted into the holes in the cap 14. The shaft driver 28 is turned on in order to rotate the shaft 22 and the cam member 24. Consequently, as the shaft driver 28 rotates the cam member 24, the combination of the downward force against the vertical axis of the canister 30 caused by the springs 16 and the cap 14 with the repetitive, cyclical upward and downward force caused by the rotation of the cam member 24 against the bottom portion 34 of the canister 30 will move the canister 30 up and down, thereby agitating the contents therein.

Referring to FIGS. 4A and 4B, with the cap 40 removed from the tubular member 42, a canister 56 is placed therein. Subsequently, the cap 40 is screwed onto the tubular member 42. The shaft driver is turned on for rotating the shaft 54 and the cam member 52. Thus, as the shaft driver rotates the cam member 52, the combination of the downward force against the vertical axis of the canister 56 caused by the spring 48 and the cap 40 with the repetitive, cyclical upward and downward force caused by the rotation of the cam member 52 against the bottom portion 60 of the canister 56 will move the canister 56 up and down, thereby agitating the contents therein.

While the invention has been particularly shown and described with reference to the preferred embodiments thereof, it will be understood by those skilled in the art that the foregoing and other changes in form and details may be made therein without departing from the spirit and scope of the invention. For example, thus far, the force applied against the vertical axis of the canister has been applied from the top of the canister, and the cam member has been in contact with the bottom of the canister, however, if desired, the force applied against the vertical axis of the canister could be applied from the bottom of the canister, and the cam member could be in contact with the top of the canister. Additionally, it has been pointed out that the apparatus agitates the pigment within a paint canister, however, it should also be pointed out that the agitation provided by the apparatus agitates all contents within an aerosol paint canister.

What is claimed is:

1. An apparatus for repeatedly agitating an aerosol canister comprising, in combination:

substantially tubular container means for enclosing said aerosol canister and for radially restricting movement of said aerosol canister to substantially vertical movement;

cap means for further enclosing an upper portion of said aerosol canister and detachably coupled to said tubular container means;

spring means for forcing said cap means against said upper portion of said aerosol canister and removably coupled between said tubular container means and said cap means;

a revolving cam member located in a bottom portion of said tubular container means so as to come into contact with a lower portion of said aerosol canister for moving said aerosol canister substantially up and down;

a shaft coupled to said cam member, said shaft extending outward from said cam member and protruding through an opening in the side of said tubular container means; and shaft driver means detachably coupled to said shaft for rotating said shaft and said cam member.

2. The apparatus of claim 1 wherein said tubular container means are couple to a support for permitting said apparatus to stand substantially perpendicular to a surface of said support.

3. The apparatus of claim 1 wherein said spring means comprises a plurality of springs removably coupled between said tubular container means and said cap means.

4. The apparatus of claim 3 wherein said tubular member means includes a plurality of retaining slots located on an interior surface thereof for retaining portions of said plurality of springs.

5. The apparatus of claim 1 wherein said portion of said aerosol canister is a bottom portion of said aerosol canister and said another portion of said aerosol canister is a top portion of said aerosol canister.

6. The apparatus of claim 1 wherein an interior surface portion of said cap means has interior threads for engagement with external threads of an exterior surface portion of said tubular container means.

7. The apparatus of claim 1 wherein said spring means comprises a spring fixedly coupled to an interior surface of said cap means, and wherein an interior surface portion of said cap means has interior threads for engagement with external threads of an exterior surface portion of said tubular container means.

8. The apparatus of claim 1 wherein said portion of said aerosol canister is a bottom portion of said aerosol canister and said another portion of said aerosol canister is a top portion of said aerosol canister.

* * * * *